(12) United States Patent
Hulse et al.

(10) Patent No.: US 9,772,240 B2
(45) Date of Patent: Sep. 26, 2017

(54) ELASTIC TORQUE SENSOR FOR PLANAR TORSION SPRING

(71) Applicant: Rethink Motion Inc., Houston, TX (US)

(72) Inventors: Aaron Hulse, League City, TX (US); Elliott Potter, Friendswood, TX (US)

(73) Assignee: Rethink Motion, Inc., Houston, TX (US)

(*) Notice: Subject to any disclaimer, the term of this patent is extended or adjusted under 35 U.S.C. 154(b) by 115 days.

(21) Appl. No.: 14/809,575

(22) Filed: Jul. 27, 2015

(65) Prior Publication Data

US 2016/0116353 A1  Apr. 28, 2016

Related U.S. Application Data

(63) Continuation-in-part of application No. 14/691,702, filed on Apr. 21, 2015.

(60) Provisional application No. 62/173,498, filed on Jun. 10, 2015, provisional application No. 62/099,191, filed on Jan. 1, 2015, provisional application No. 62/061,815, filed on Oct. 9, 2014.

(51) Int. Cl.
  *G01L 3/02* (2006.01)
  *G01L 3/14* (2006.01)
  *F16F 1/02* (2006.01)
  *G01B 11/16* (2006.01)

(52) U.S. Cl.
  CPC ............ *G01L 3/1407* (2013.01); *F16F 1/027* (2013.01); *G01B 11/16* (2013.01)

(58) Field of Classification Search
  CPC ......... G01L 3/1407; F16F 1/027; G01B 11/16

USPC ............. 73/800, 862.08, 862.324, 862
See application file for complete search history.

(56) References Cited

U.S. PATENT DOCUMENTS

| | | | |
|---|---|---|---|
| 4,235,437 | A | 11/1980 | Ruis |
| 4,569,518 | A | 2/1986 | Fulks |
| 4,711,450 | A | 12/1987 | McArthur |
| 4,778,175 | A | 10/1988 | Wucherpfennig |

(Continued)

FOREIGN PATENT DOCUMENTS

EP  1933948  6/2008

OTHER PUBLICATIONS

Futek Advanced Sensor Technology, Inc., www.futek.com/product, load cell, 1998-2016, Irvine, California.

(Continued)

*Primary Examiner* — Max Noori
(74) *Attorney, Agent, or Firm* — David McEwing

(57) ABSTRACT

An elastic torque sensor utilizing a torsion spring and components to measure the movement of the spring output side and input side. The torque sensor is in communication with a programmable controller. The components detecting movement or distortion of the either side of the torsion spring are not positioned within the load path experienced by the torsion spring. This configuration allows the detected position of the spring input and output sides not to be distorted by hysteresis. The components comprise a sensor disk that is attached to either the spring input or output side. The sensor disk is not within the spring load path. The sensor disk rotates with the torsion spring. The sensor disk is mark so that the degree of rotation can be detected by a stationary sensor also not in the load path. The sensor disk can send a signal to a programmable controller.

28 Claims, 6 Drawing Sheets

(56) References Cited

U.S. PATENT DOCUMENTS

| | | | |
|---|---|---|---|
| 4,811,946 A | 3/1989 | Pelczar | |
| 4,828,257 A | 5/1989 | Dyer | |
| 4,930,770 A | 6/1990 | Baker | |
| 5,020,794 A | 6/1991 | Englehardt | |
| 5,117,170 A | 5/1992 | Keane | |
| 5,147,989 A * | 9/1992 | Ito | B60S 1/08 200/11 R |
| 5,697,869 A | 12/1997 | Ehrenfried | |
| 5,738,611 A | 4/1998 | Ehrenfried | |
| 5,919,115 A | 7/1999 | Horowitz | |
| 5,993,356 A | 11/1999 | Houston | |
| 6,138,520 A * | 10/2000 | Chang | G01L 3/1435 343/753 |
| 6,170,162 B1 * | 1/2001 | Jacobsen | G01D 5/2415 33/1 PT |
| 6,269,702 B1 * | 8/2001 | Lambson | G01L 3/108 73/862.045 |
| 8,291,788 B2 | 10/2012 | Ihrke | |
| 8,968,155 B2 | 3/2015 | Bird | |
| 2007/0079315 A1 * | 4/2007 | Mittersinker | G10H 1/0091 720/656 |
| 2011/0083595 A1 * | 4/2011 | Collovati | A01C 7/046 111/174 |
| 2012/0053014 A1 | 3/2012 | Zhu | |
| 2014/0174201 A1 * | 6/2014 | Zhong | G01L 3/104 73/862.191 |
| 2015/0272809 A1 | 10/2015 | Accoto | |

OTHER PUBLICATIONS

Dino Accoto and Giorgio Carpino, Design and characterization of a noval . . . , Intech, Aug. 13, 2013, p. 1-12, vol. 10, Roma, Italy.

Fabrizio Sergi, Design and characterization of a compact . . . , IEEE, Jun. 24, 2012, p. 1931-1936; Roma, Italy.

Huajiang Ouyang, Experimental and theoretical studies of a bolted joint . . . , Intern. Journal of Mechanical Sciences, Dec. 2006, 1447-1455, UK.

International Searching Authority, PCT Search Report, Mar. 16, 2016, 1-10, Commissioner of Patents, Alexandria, Virginia, USA.

International Searching Authority, PCT Search Report, Apr. 21, 2016, 1-14, Commissioner of Patents, Alexandria, Virginia, USA.

International Searching Authority, PCT Search Report, Jan. 20, 2016, 1-10, Commissioner of Patents, Alexandria, Virginia.

* cited by examiner

FIGURE 5

Step No.

1. Monitor input side sensor disk

2. Does input side move? Y/N

3. If "yes", Stationary sensor detects movement of input side sensor disk

4. Stationary sensor sends signal of amount of movement of sensor disk (and therefor amount of movement of input side of torsion spring).

5. Amount of movement is computed (degrees of rotation of deflection)

6. Amount of force on input side using calculated amount of movement of input side and spring constant 7. Does output side move? Y/N 8. If "yes", amount of movement is detected by movement of sensor disk detect by stationary disk.

9. Stationary sensor sends signal of amount of detected movement of sensor disk (and therefor output side of torsion spring).

10. Reconciliation of calculated force from input side with calculated force from output movement 11. Off set (counter balance) force for input side may be calculated.

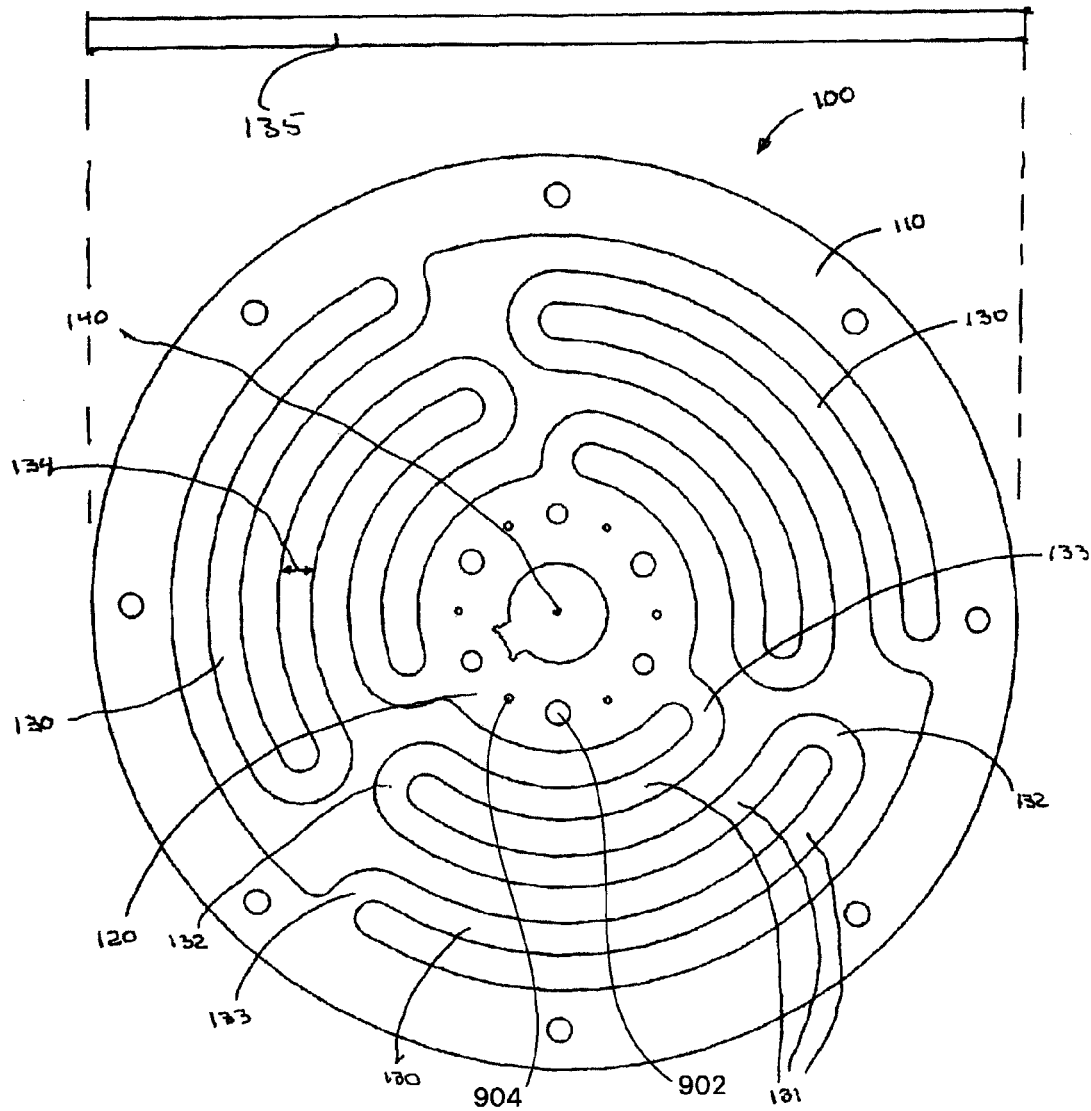
Figure 6a Top View
New Drawing

ELASTIC TORQUE SENSOR FOR PLANAR TORSION SPRING

RELATED APPLICATIONS

This nonprovisional Application No. 14/809,575 claims priority to and the benefit of provisional application 62/061,815 filed Oct. 9, 2014 and entitled "Elastic Torque Sensor for Planar Torsion Spring". This nonprovisional Application Ser. No. 14/809,575 also claims the priority to and the benefit of application 62/099,191 filed Jan. 1, 2015 and entitled "Concentric Arc Spline Rotational Spring". Further, this Application 14/809,575 claims priority to and the benefit of non-provisional application Ser. No. 14/691,702 entitled "Series Elastic Motorized Exercise Machine" filed Apr. 21, 2015. This nonprovisonal application Ser. No. 14/809,575 further claims the benefit and priority to provisional application No. 62/173,498 entitled "Elastic Torque Sensor for Planar Torsion Spring" filed Jun. 10, 2015. All of the above applications are incorporated by reference herein in their entirety.

1. Field of Use

This disclosure pertains to measurement of torsion spring deflection. It pertains to control signals that can be used to maintain a constant torque or varying the torque in response to applied force. The elastic torque sensor subject of this disclosure can be used in conjunction with motorized exercise equipment such that active force simulates gravity.

2. Background of Invention

Advances have been made in planar torsion springs in conjunction with robotic devices. These advances have included development of torque sensors. These torque sensors have, however, been included in the load path of the planar torsion spring. This has created problems with accuracy of the sensors. It has been discovered that subjecting the sensor components to the load results in a positional lag or hysteresis in the sensor causing false position information to be transmitted to a programmable computer processor or microprocessor, resulting in inaccurate torque calculations.

BRIEF SUMMARY OF THE DISCLOSURE

The disclosure subject of this application pertains to a pair of sensors or encoders positioned with a planar torsion spring. Similar to a conventional coil spring, the planar torsion spring has a load input side and a load output side. The physical configuration is, however, very different. The planar torsion spring is comprised of two concentric rings. There is an outer ring, hereinafter termed the output side. There is a inner concentric ring positioned within the output side. The inner ring is hereinafter termed the input side. The inner and outer rings can have the same axis of rotation.

The planar torsion spring can be made of various materials including composite materials. The planar torsion spring is preferably made of metal such as steel. In some embodiments it can be made of maraging steel, a steel composite having a high yield strength.

This disclosure incorporates by reference herein in its entirety the application Ser. No. 12/564,090 (Publication No. US 2011/0067517) of Chris Ihrke et al. entitled Rotary Series Elastic Actuator, published Mar. 24, 2011.

The input side and the output side of the planar torsion spring are substantially flat rings with the input side fitting within the circumference of the output side. The input side and output side are connected by at least one spoke or spline (hereinafter termed splines). The splines may extend from the outer circumference of the input side and extend radially to the inner diameter of the output side. In another embodiment, the spline may extend from the outer circumference of the input side and extend in an annular direction substantially parallel to the circumference of the input side. The spline will have a generally spiral orientation and converge and attach to the inner circumference of the output side. As will be discussed in greater detail below, the spline can allow movement of the output side or input side relative to the input side or output side respectively.

The spline will have a thickness and width. These dimensions can be controlled. These dimensions can control the stiffness of the splines. These dimensions control the spring characteristics of the splines and of the planar torsion spring. As mentioned above, either the input side or output side of the planar torsion spring can move in response to a force (torque force). This can be rotational movement. The rotational movement will transfer to the spline. However, the stiffness of the splines is controlled. The splines (and thus the planar torsion spring) are not completely stiff but rather have a spring coefficient. The spring coefficient can be calculated into a spring constant. The spring constant can be used to calculate the degree of movement of either the input side or output side relative to movement of one side in response to a quantity of a torque force.

For example, if the output side rotates 1° relative to the input side in response to a torque, the spring constant can be used to calculate the amount of torque that is being applied to the planar torsion spring. As will be discussed in greater detail below, the movement sensor disks for each of the input side and output side, as well as the sensor components detecting movement of the sensor disks of either the input side or output side are outside the load path. This is distinct from prior art devices.

The degree of rotation of the output side and the input side can be measured by the teaching of this disclosure. It will be appreciated that the planar torsion spring can rotate fully through a circle. Using the example in the preceding paragraph, the relative angular degree of movement of the input side and/or output side can be measured. Based upon this measured value or values of angular degree of movement and the known spring constant, the amount of torque experienced by the planar torsion spring can be calculated. It will be appreciated that the calculated torque is based on the predictable properties associated with the deformation of materials.

There needs to be a minimum of 1 angular position sensor to measure the torque. This sensor can be based on optical, capacitive, magnetic, inductive, etc. properties to function. The sensor used as described herein may be used to determine angular movement or spring deflection.

In the case of one position sensor, the relative deflection of the spring is measured by movement of markers placed around the circumference of a sensor disk. This disk is sometimes referred to as a sensor rotor. The sensor disk is attached to the planar torsion spring. However the sensor disk is independent of the load path of the elastic torque sensor subject of this disclosure.

The movement of sensor disk (resulting from movement of either the output side or input side of the planar torsion spring) is detected by a stationary sensor component. The stationary sensor component is attached to a stationary structural component of the elastic torque sensor. The stationary sensor component detects each marker of the sensor disk that passes in front of the stationary sensor. The stationary sensor may send a signal to a computer, programmable controller or similar device to count the number of markers that have passed per unit of time. In this way, the movement of the planar torsion spring (hereinafter "torsion spring" or "spring") can be computed. With a known spring constant, the torque can be computed In the case of two or more sensor configuration, i.e., each sensor comprising the combination of a sensor disk and a stationary sensor, the input and the output sides of the torsion spring can be measured independently.

It will be appreciated that each output or input side of the torsion spring can rotate relative to the other side. This amount of rotation is a function of the flexibility of the splines (calculated to compute a spring constant) and amount of torque applied. Also the torsion spring can rotate as one unit, i.e., the input and output sides rotate together. This rotation can occur with a fixed or set rotational degree of deflection between the input and output side (i.e. constant torque).

The combination of sensors can provide the information to also allow computation of the angle of deflection of the planar torsion spring. This disclosure also teaches a novel method of measuring the rotational degree of deflection between the output side and the input side. The preferred embodiment comprises two disks (sensor disks). One sensor disk is mounted to the input side. The second sensor disk is mounted to the output side. Each disk is round and has a circumference. In one embodiment, the diameter of each disk is larger than the diameter of the output side (the outer concentric ring of the planar torsion spring). This expanded circumference provides greater resolution to some embodiments of the stationary sensor. In one embodiment, each disk is marked along or proximate to the circumference. These can be tick marks, electromagnetic readable markers, incremental encoders, absolute position sensors (inductive, capacitive, optical) or resolvers, capacitance reading marks or other methods know to persons skilled in the art. The marking designate degrees or partial degrees of the circumference. There are, of course, 360° in the circumference of each circle.

The important things are that the angles measured by the sensors are differenced and multiplied by the spring constant to get the torque and that they are mounted outside of the load path.

The markers on each sensor disk pass in front of a stationary sensor. The stationary sensor will detect each marker that passes (as the input or output side of the torsion spring rotates). As stated before, both the sensor disk and stationary sensor are outside the load path of the elastic torque sensor and the sensor disk rotates passively with the torsion spring. Again, the rotating or stationary sensor disk is not attached to any other component (except to either the input side or output side of the torsion spring).

In the Applicant's preferred embodiment of the disclosure, the separating of the rotating disk from any other component, including separating the sensor disk from the stationary sensor has had the unexpected benefit of decreasing the measured hysteresis of the spring. The low hysteresis is due to the removal of the sensor disk (sensor rotor) and stationary attached sensor component from the load path. Removal of the sensor disks (sensor rotors) from the load path has been noted to be particularly beneficial. The Applicant's configuration has achieved hysteresis factors as low as 0.25 percent of maximum load experienced by the planar torsion spring. Typically the hysteresis factor exceeds 1 or 2 percent of the load.

Another benefit of the Applicant's novel configuration is that calibration is not lost or adversely impacted by shock loads, e.g. sudden increases or decreases in the torque applied to the planar torsion spring.

BRIEF DESCRIPTION OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 5 is an illustrated flow chart for the disclosure.

FIG. 6a illustrates one design of a torsion spring taught by the disclosure comprising three splines with expanded concentric arc construction. FIG. 6a is a top view. The dimensions of spline thickness and spline depth are clearly illustrated. FIG. 6b illustrates a side view. The depth of the spline is clearly viable. It will be appreciated that each spline concentric arc has the same or similar axis of rotation. This is the axis of rotation of the inner ring and the outer ring or is based upon this axis of rotation.

DETAILED DESCRIPTION OF DISCLOSURE

Figure 1:
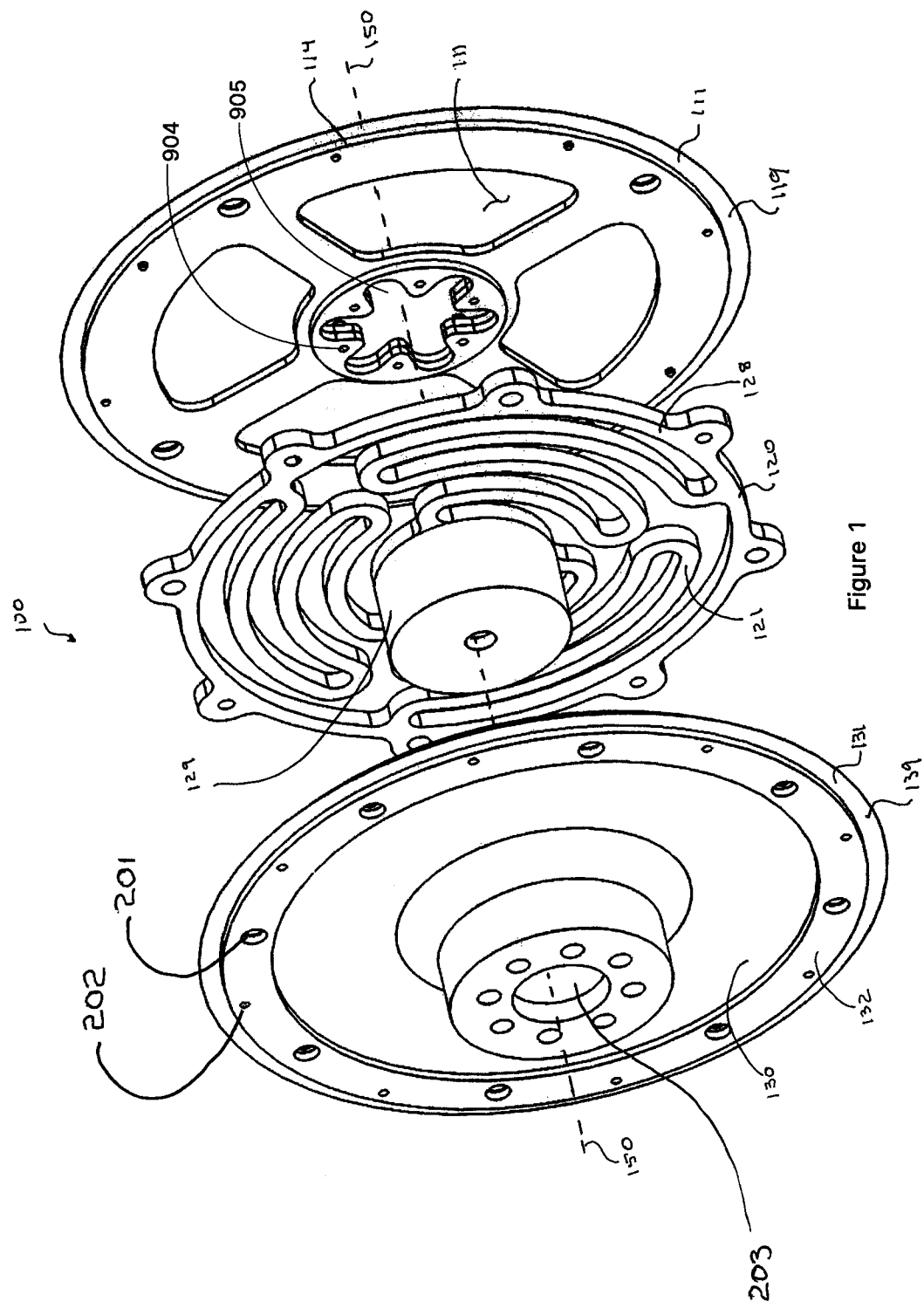
FIG. 1 illustrates an exploded or expanded perspective view of the planar torque spring. Illustrated is the Applicant's novel 3 spline torsion spring, the sensor disk mounting bracket and the input side sensor disk. Also shown is the outside circumferential edge of the output side sensor disk protruding from the output bracket and support ring. Also illustrated is the load bearing torsion spring support. It will be appreciated that the sensor disks is not within the load path. Also shown is the axis of rotation.

The Applicant's disclosure incorporates an planar torsion spring. The disclosure utilizes sensors having the ability to measure the angular deflection of either the input side or output side of the planar torsion spring. Such deflection result from an applied load.

This can be one angular measurement sensor that has both the stationary side (stator) and moving side (rotor) mounted (outside of the load path) to the input and output sides of the spring respectively. The preferred embodiment has two angular measurement sensors with rotors or sensor disks attached to both the input and output sides of the spring. There are complementary stationary sensors (stators) each mounted to the non-moving reference frame.

In the single sensor embodiment, the deflection of the spring is directly measured by the angle sensor (sensor disks) and multiplied by the spring constant to ascertain the torque.

In the preferred embodiment, two or more angle sensors (sensor disks) measures the angle formed between the position of the torsion spring to its respective side in the non-moving reference frame. The torque is then calculated by multiplying the difference between the output and input angle sensors by the spring constant. In either case, it is imperative that the sensor rotors are mounted outside of the load path of the spring in order to minimize hysteresis.

In one embodiment of the Applicant's disclosure, the sensor disks can be translucent, e.g., clear plastic or polymer. In other embodiments, the sensor disks can be metal, plastic or other material that can be machined or molded. In one embodiment, the sensor disks can contain a circumferential band of tick marks. The degree markings (or partial degree markings) can be opaque. In this embodiment, the opaque tick marks are detectable by the stationary sensor. The tick marks on the sensor disk are positioned to pass in front of the stationary sensor. In another embodiment, the sensor disk markings can be electromagnetic which can be detected by the stationary sensor.

The Applicant's disclosure teaches a very high degree of resolution regarding the position of the planar torsion spring. In one embodiment described in part in the preceding paragraph, there were 120,000 tick discrete detectable marks on each sensor disk. As will be appreciated the marks are detected by the stationary sensor.

The Applicant's design requires a method of measuring angular position of the input and output sides of the torsion spring wherein the measuring device is mounted outside of the load path. These devices could be incremental encoders, absolute position sensors (inductive, capacitive, optical), or resolvers. It is important that the angles measured by the sensors are differenced and multiplied by the spring constant of the torsion spring to compute the torque applied and that the measuring devices are mounted outside of the load path.

In one embodiment shown and described herein, the detectable marks (sometimes referred to as tick marks) are place on the edge of the sensor disk. It will be appreciated that the marks can be placed elsewhere on the sensor disk. Placement would be in a circular pattern around the axis of rotation. The stationary sensor would be positioned on a stator or other stationary, non load bearing component. The stationary sensor is not in contact with the sensor disk.

As used herein, the load path is simply the direction in which each consecutive load will pass through connected members. As stated, the sensor disks and the stationary sensors are not within the load path of the torsion spring or interconnected components. As described and illustrated in the Figures, the stationary sensor is connected only to a stationary structure. The stationary sensor is not interconnected with any other component. Similarly, the sensor disk is connected only to torsion spring. The sensor disk is not interconnected with any other component. As described further, the sensor disk and stationary sensor, although perhaps positioned in close proximity, are not interconnected. It will be appreciated that the torsion spring can be connected to other movable structural members such a gear or motor shaft. However such additional members are not subject of this disclosure and accordingly not described. The additional components may also be varied depending upon the application of the torsion spring.

As described in greater detail below, each sensor disk is attached to the torsion spring. One sensor disk is attached to the torsion spring input side (inner ring). The other disk (positioned on the opposite side of the torsion spring) is attached to the output side (outer ring) of the planar torsion spring. Each respective sensor disk rotates or moves with the rotation spring of the applicable side of the spring.

Specifically, movement of the input side of the torsion spring will cause movement of the sensor disk attached to the torsion spring input. This movement can be the result of torque (or "load") being applied to one side of the planar torsion spring. If torque is applied to the input side of the planar torsion spring, this will cause movement of the first sensor disk (the disk attached to the input side of the spring). This movement of the sensor disk will be detected by the input sensor, i.e., the combination of markers on the sensor disk and the stationary sensor. It will be recalled that the input sensor is in a fixed position and does not rotate with the torsion spring or sensor disk. The stationary sensor may be mounted on a stationary structure independent of the rotational movement of the sensor disks or the torque load on the planar torsion spring. Also the sensor disk is outside the load path. It will not be directly affected by the addition of torque on the spring. The sensor disk moves only in passive reaction to the rotation of the planar torsion spring.

Similarly the sensor disk (sensor rotor) attached to the output side of the torsion spring (outer ring) rotates with the planar torsion spring. Movement of the output side of the torsion spring (regardless of the absence of movement of the input side) will be detected by the output sensor component discussed above. The stationary sensor (stator) is fixed to a non-moving or stationary structure of the elastic torque sensor. Neither the sensor disk or sensor component is part of the load path.

In one embodiment, one subcomponent of the stationary sensor will shine a light beam across and through the transparent sensor disk. See paragraph [0019] above. The light beam will be detected by the second subcomponent of the stationary sensor (a light receiver). When an opaque degree marking crosses the light path, the light sensor component will detect an interruption in signal. This will cause the sensor to send a signal. The sensor may send the signal to a CPU, microprocessor, controller or similar devices. Such device may calculate the amount of movement of spring, the degree of deflection of the output side relative to the input side, the angular movement, the position of the planar torsion spring, the speed of rotation and the resulting hysteresis. The stationary sensor will also signal the number of tick marks passing per unit of time. This information can also be communicated to the programmable controller. Utilizing the spring constant of the torsion spring, the torque experienced by the spring can be calculated.

In another embodiment, the sensor disk can have notches or teeth placed on the circumference. The position sensor would detect the interruptions in light caused by the notches or teeth rotating through the light path.

In yet another embodiment, markings can be placed on the circumference of the output side and the input side respectively. In one embodiment, the markers can be reflective and the position sensor will detect the reflected light. This will eliminate the need for two subcomponents.

Figure 2:
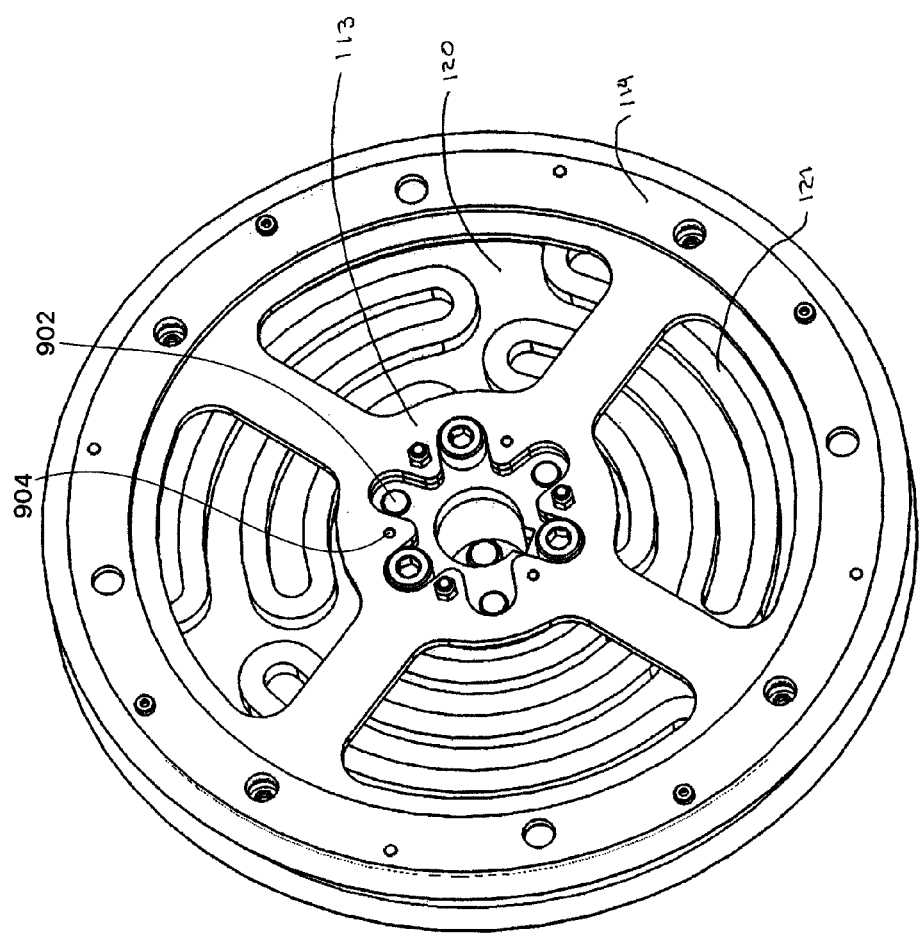
FIG. 2 illustrates a reverse view of a portion illustrated in FIG. 1. Illustrated is the sensor disk mounting bracket, and the torsion spring(behind the sensor disk mounting bracket). The input side sensor disk is not shown.

FIG. 1 illustrates an example of a torsion spring assembly 100. The illustration is an exploded view. The planar (flat) torsion spring 120 is illustrated. (For a full view of the torsion spring and its operation, reference is made to Applicant's application Ser. No. 14/792,882 filed Jul. 7, 2015 and entitled "Concentric Arc Spline Rotational Spring" which is incorporated herein in its entirety. FIGS. 2a and 2b of the Ser. No. 14/792,882 application are attached hereto as FIGS. 6a and 6b.) The torsion spring rotates about the axis of rotation 150. This axis of rotation 150 is shared with the outer ring 128 (the output side). The inner ring is not visible in FIG. 1. (The inner ring is covered by the junction hub or load bearing torsion spring support 129.) A portion of the splines 121 is shown. It will be appreciated that the spline joins both the outer ring (spring output side) and the inner ring (the spring input side). The outer circumference 119 of the first sensor disk 111 is also shown. The full view of the first sensor disk is hidden by the sensor support bracket 114. The sensor support bracket is attached to the torsion spring. (This shown in FIG. 2). The first sensor disk rotates with movement of the input side. A portion of the first sensor disk 111 is visible between the radial portion of the support bracket. The entire disk may be translucent with the exception of the tick marks (which may be used in one embodiment of the disclosure). The sensor disk is not within the load path experienced by the torsion spring. The sensor disk 111 is attached to the torsion spring 120 separately from a torque or load transfer component, e.g., a gear or motor shaft, mounted within the axis of rotation 150. The torsion spring is also referenced herein as an elastic torsion spring. This separate mounting is shown in FIG. 6a. FIG. 6a illustrates two sets 904, 902 of attachment holes within the input side of the torsion spring. In the embodiment shown in this FIG. 6a, there are two sets of attachment holes wherein each set consists of 6 attachment holes. Other configurations are possible. FIG. 2 shows attachment utilizing bolts or threaded rod and nuts with the attachment holes. The separate attachment configuration is also illustrated in FIG. 2 of the present invention disclosure. FIG. 2 illustrates a non-load bearing sensor disk mounting bracket 114. Also illustrated is a center junction 113 of the mounting bracket. This center junction may align with the input side 120 of the elastic torsion spring shown in FIG. 6a. FIG. 2 of the present invention disclosure shows the mounting bracket positioned over the elastic torsion spring. FIG. 1 shows an exploded view of the mounting bracket and the elastic torsion spring. The mounting bracket is dimensioned to allow one attachment component, e.g., motor or rotor shaft, to attach to the elastic torsion spring by passing through lobes 905 in the center junction 113. The lobes allow the passage of connecting components, e.g., bolts or screws, for the load conveying component into the input side of the torsion spring. It will be appreciated that no torque or load is transferred from the motor or rotor shaft to the mounting bracket 114. The instant invention disclosure expressly states FIG. 2 illustrates the non-load bearing sensor disk mounting bracket 114. The center junction 113 of the mounting bracket illustrated in FIGS. 1, 2 also contains a set of six attachment holes 904 that may interface with the six attachment holes 904 illustrated in FIG. 6a discussed above. These attachment holes may position the sensor disk mounting bracket 114, holding one sensor disk 111, to the torsion spring 120.

Also illustrated in FIG. 1 is the outer edge 139 of the second sensor disk 131. This outer edge can be the location of the tick marks in some embodiments of the disclosure. This is the sensor disk attached to the spring output side. The second sensor disk 131 is held in place between the output bracket 130 and support ring 132. The second sensor disk passively rotates with movement of the output side of the torsion spring 120. Stated differently, the sensor disk is not connected to any component other than on a side (input or output) of the torsion spring. The outer edge 139 of the second sensor disk 131 turns or rotates with the rotation of the planar torsion spring. As will be disclosed later, the edge of the sensor disk can rotate through an opening or proximate to the side of a stationary sensor. The stationary sensor can detect various types of marks on, for example, the edge of the sensor disk.

As previously disclosed, the splines connect the input side with the output side 128. The elasticity of the splines permits the output side or input side to rotate relative to the respective input side or output side.

FIG. 2 illustrates the non-load bearing sensor disk mounting bracket 114. Behind the mounting bracket is the torsion spring 120. Also shown is a partial view the splines 121. Thin torsion spring input is hidden behind the center junction 113 of the disk mounting bracket 114. The second sensor disk is attached to the output side (110 of FIG. 1).

Each sensor can be thought of consisting of two components. The first component is the sensor disk (sometimes referred to a rotor disk) described above. The second stationary sensor is a device positioned on a stationary structure of the elastic torque sensor. This second sensor disk (like the first sensor disk,) also is not within the load path. The second sensor component (sensor disk and stationary sensor) may utilize optical, capacitive, magnetic properties or any other system known to persons skilled in the art.

Figure 3:
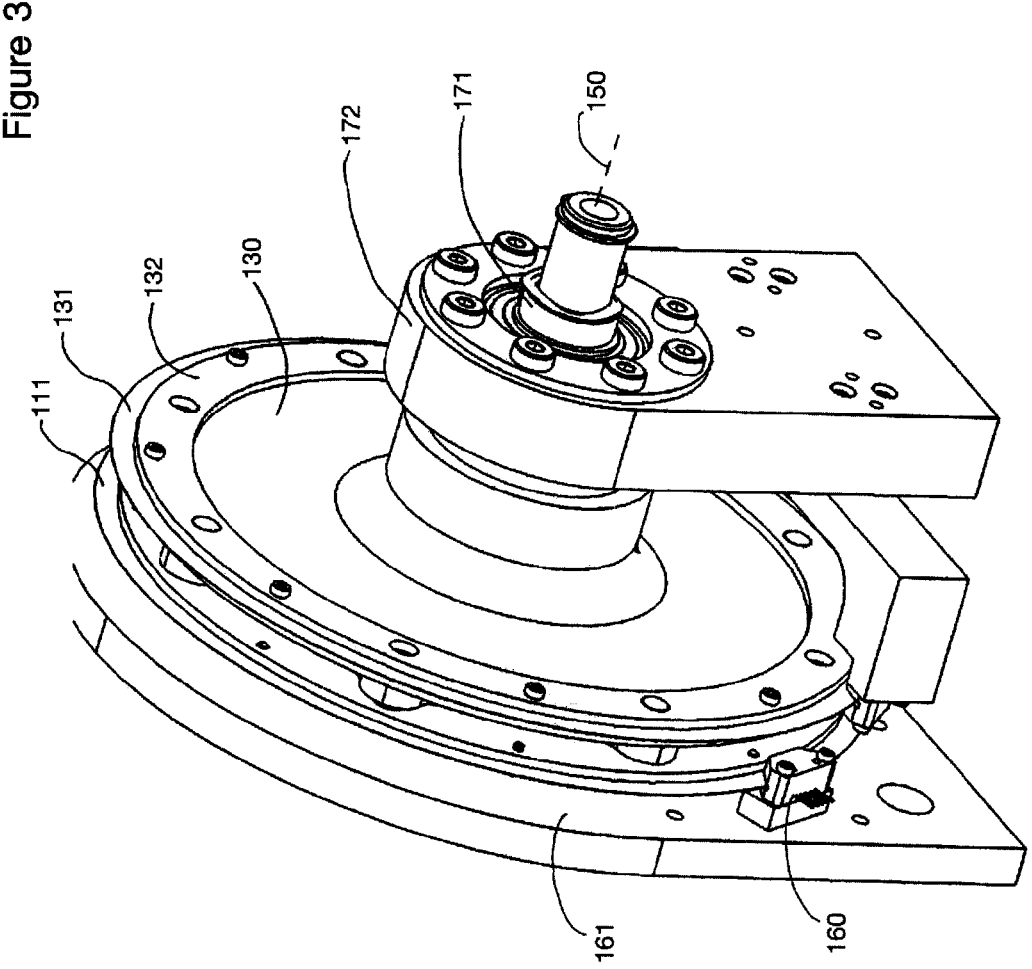
FIG. 3 illustrates a perspective view of the torsion spring within the output bracket, output bracket support ring, the edge of the first and second sensor disks and one stationary sensor (input sensor) load bearing cap that connects to the input side of the torsion spring. This cap attaches to the opposite side of the torsion spring from the frame described as FIG. 2.

FIG. 3 is another view of the torsion spring configuration. Illustrated is a stationary plate 161. This structural element is not load bearing. Shown attached to this structure is a stationary sensor 160. This sensor interacts with the first sensor disk 111. This sensor disk is attached to the input side of the spring. Note that the stationary sensor fits over the circumferential edge of the sensor disk. The two components are not in contact. The rotation of the sensor disk, coupled with the rotation of the torsion spring under load, is not impeded.

Also shown in FIG. 3 is the exposed edge of the second sensor disk 131. The stationary sensor for this disk is not shown. Illustrated is the support ring 132 and the output bracket 130. Also illustrated are other components which may be used in an embodiment of the invention. These are a bearing fixture 172 and bearings 171. The axis of rotation 150 is also illustrated.

Figure 4:
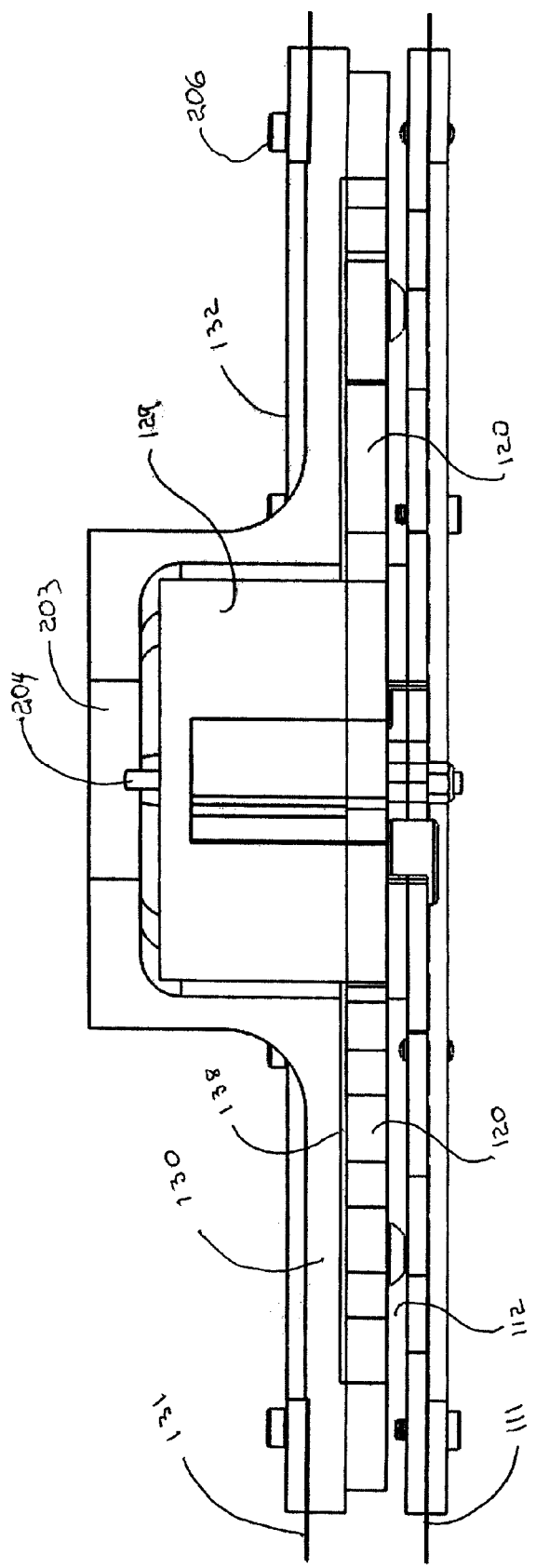
FIG. 4 is a side view of the assembly containing the planar torsion spring. Illustrated is the torsion spring and the first sensor disk (input side) and second sensor disk (output side). Also illustrated output bracket, output bracket support ring. Also illustrated is the load bearing torsion spring support (and its location within the output support bracket). Note the stationary sensors are not shown. The inside surface of the load bearing plate may have an offset to prevent the inside surface touching the torsion spring.

FIG. 4 illustrates a side view of the device subject of the disclosure. Illustrated is an edge view of the first sensor disk 111 and the second sensor disk 131. Also illustrated is an edge view of the torsion spring 120. Note the spaces 112 and 138 allowing for free (unimpeded) rotation of the torsion spring. Illustrated is the load bearing torsion spring support 129 which fits within the output bracket 130. Also shown is the circular ring 132 holding the output sensor disk 131 to the output bracket 130. The torsion spring support 129 extends into or through the output bracket. FIG. 4 illustrates an attachment component 204 of the torsion spring support extending through the aperture 203 of the output bracket. This aperture is also shown in FIG. 1. The torsion spring support and attachment component 204 may be within the load path. The attachment component may be attached to another load component such a pulley device. Since such additional load component is not part of this disclosure, it is not described in further detail. The torsion spring support is attached to the torsion spring through the attachment holes 902. See FIG. 6a.

FIG. 5 illustrates a logic flow diagram of the operation of the stationary sensor with the sensor disk and a possible controller, microprocessor or CPU, etc., in conjunction with the movement of the output sensor. The stationary sensor can emit a signal at a rate of at least 10 kilohertz (10,000 cycles/sec). In one embodiment the signal is a pulse of light. The light pulse monitors the position of the input side of the sensor disk (Step 1). In another embodiment, the light source is continuous. If the stationary sensor detects a change in signal, either an interruption of the light signal received by the stationary sensor or receipt of a light source, the sensor detects rotational movement of the input side. A signal will be sent to the computer processor or controller (Step 4). The rotational angle can be detected. The amount of force can be computed using the spring constant. (Step 6).

The number of light signal interruptions can be detected by the stationary sensor and counted by the computer processor (Step 4 and 9). In one embodiment, the number of interruptions correlates to the number of tick marks on the circumference of the sensor disk attached to the output side. The number of ticks correlates to the distance of the circumference traversing across the encoder receiver. This correlates to the number of degrees of the arc segment. The length of the arc is calculated by the computer processor. Knowing the spring constant, the amount of force experienced by the output side can be calculated (Step 8).

Simultaneously, a separate stationary sensor monitors the output side (Step 7). If movement is detected, the receiver submits a signal of the number of light interruptions (or light reflections if reflective markers are used) to the computer processor and the processor calculates the force based upon the amount of movement and spring constant (Step 9).

The controller can compare the calculated measurements of force on the output side and on the input side and measure the difference in position of the output side and the input side, multiply the difference by the spring constant and measure the applied torque. (Step 10)

The process is repeated for the next time interval. In the preferred embodiment, the time interval is at least $1/1 \times 10^{-5}$ second. (Step 8). If movement is detected, the movement is measured from the previous read position (Step 3). The force is calculated based upon the movement to the new position. (Step 5 and 8). Steps 2 through 10 are repeated.

In a preferred embodiment, a stationary sensor (encoder) transmits a light signal through the sensor disk attached to the input side of the planar torsional spring. The light is transmitted through the translucent disk to an stationary sensor receiver subcomponent on the opposite side of the disk. As discussed previously, the circumference of the disk is marked with opaque tick marks. These marks interrupt the light signal as the input side moves through the light signal. The interruptions are detected by the stationary sensor receiver subcomponent. The receiver can transmits a signal of the interruption to a computer processor, etc. The computer processor can calculate the distance rotated by the disk.

In step 5 the computer processor computes the rotational movement based upon the signals received from the stationary sensor receiver subcomponent. Using the known spring constant, the computer processor calculates the force experienced by the input side (Steps 10 and 11). Simultaneously, signals from the stationary sensor monitoring the sensor disk attached to the output side. These signals can be used by the computer processor to ascertain whether the output side has moved (Step 5).

If movement is detected, the amount of rotation is calculated by the computer processor based upon the signals received from the stationary sensor receiver subcomponent (Steps 8 and 9). The amount of force experienced on the output side can be calculated based upon the amount of deflection and the spring constant. This computed force can be reconciled with the value computed in Step 10 above.

In an embodiment, the computer processor can compute the amount of offset force that could be generated by a torque force generator.

It will be appreciated that the sensors, both the stationary sensor signal transmitter subcomponent and signal receiver subcomponent are not affixed to the planar torsion spring. These sensors, that may be in communication with the computer processor or microprocessor, are independently mounted to frame or similar structure of the device and are not in the load path experienced by the output side or input side of the torsion spring.

Alternate sensor mechanisms can include a resolver, i.e., an analog encoder that converts an angle into a voltage level that can be read by an analog digital converter (ADC), or an Absolute Position Sensor (APS) that provides an exact angle based on a fixed zero point. In one embodiment, the sensor utilizes an incremental encoder. The incremental encoder requires a startup step of positioning the output and input sides each time the spring is activated.

In one embodiment, the stationary sensor component may be an optical encoder attached to a stationary structure and can transmit an optical signal to a reader sensor subcomponent on the opposite side of the transparent sensor disk circumference. (It will be appreciated that in an embodiment of the disclosure, there will be two sensor disks. The first sensor disk is attached to the input side of the planar torsion spring. The second sensor disk is attached to the output side of the planar torsion disk. Both sensor disks rotate with the input or output side of the torsion spring respectively. Both sensor disks are not in the load path.)

The sensor disk, in one embodiment, is translucent thereby allowing the optical signal to be transmitted through the disk and to the reader of the encoder (subcomponent of the second sensor component). The tick marks positioned on the sensor disk are opaque, thereby blocking the optical signal as, for example, the output side rotates in response to torque. This causes an interruption of the signal received by the read head of the sensor. This signal can be transmitted to a computer processer, microprocessor or other device. The same mechanism applies for rotation of the input side with its attached sensor disk.

It will be appreciated that the output side and input side have an opportunity for limited independent rotation. For example, the output side of the torsion spring may move (rotate) without movement (rotation) of the input side of the torsion spring. This movement (and lack of movement) will be reflected in movement of the sensor disks. The movement of the ticks located on the circumference of a sensor disk will be detected by the position sensor. This may cause a signal to be emitted from one or both position sensors. (As already discussed, the detectible markers are not limited to be located proximate or on the circumference of the sensor disk. In one alternate embodiment, the markers on the sensor disk may have electromagnetic properties that produce a signal within the stationary sensor as each marker passes proximate to the stationary sensor.)

Torque is calculated by multiplying the difference between the output position and input position sensors by the known spring constant for the material and design of the torsion spring. It is the difference between the angle measurements (of the output position and input position) that relates to the torque being applied.

This independent movement of the output side and the input side creates distortion in the shape of the planar torsion spring. This distortion is particular noted in the splines. Since, as stated repeatedly in this disclosure, it is important to measure the position or shape of the torsion spring. As stated, the torsion spring moves in response to the imposition of a load (or torque). When the load is removed, the torsion spring is intended to return to its original shape.

Again, measurement of the position (or shape) of the inner circle (input side) relative to the outer ring (output side) is the function of the sensor disks and the stationary sensors.

In the prior art devices, the prior art component (replaced by the Applicant's sensor disk) is in the load path of the torsion spring. As already stated, the Applicant's sensor disk is not in the load path. This has a significant advantage. The prior art mechanism, being in the load path, is distorted under the load and does not fully return to the original position when the load was removed. This is not experience by the sensor disks of the Applicant's device. This distortion of the prior art device appears as if a load is continued to be applied. In contrast, there is no mechanical interference between the sensor disk and the torsion spring, thereby removing the vast majority of the hysteresis. This allows for a more accurate measure of load applied to the torsion spring.

The Applicant's disclosure teaches a novel configuration of sensor devices. Here, the disclosure teaches a combination of sensor disks attached to the opposing input side and output side of the torsion spring with stationary sensors. The sensor mechanisms interact with each other. Both the sensor disks and stationary sensors are outside the load path. The sensor disk, are attached to the torsion spring. The torsion spring is certainly a load bearing element. The sensor disks are not attached to anything else. They passively move with the torsion spring. Similarly, the stationary sensors are attached to structural elements of the elastic torque sensor that are also not in the load path. Not being in the load path means not being subject to the imposition of torque or load.

Separating the torsion spring from the sensors (and positioning the sensor outside the load path) has had the unexpected benefit of decreasing the measured hysteresis of the spring. This benefit is also experienced by separating the sensor disk from the stationary sensor. The low hysteresis is due to the removal of the sensor disk (sensor rotor) and stationary attached sensor component from the load path. Removal of the sensor disks (sensor rotors) from the load path has been noted to be particularly beneficial. The Applicant's configuration has achieved hysteresis factors as low as 0.25 percent of maximum load experienced by the planar torsion spring. Typically the hysteresis factor exceeds 1 or 2 percent of the load.

The low hysteresis due to the removal of the load path from the sensor rotor mounting allows use of lighter (less stiff) torsion springs. Low stiffness of the torsion springs was found to be a factor in using high stiffness torsion springs. However this stiffness limited the movement or deflection of the spring causing difficulty in achieving the desired high resolution.

As previously disclosed, the above describes only one embodiment of the disclosure. Other mechanisms for monitoring the rotation of the output side or input side are subject of this disclosure. For example, in sensor disks may have notched teeth or prongs. Like the tick marks illustrated in FIG. 2, the prongs or teeth can block the optical signal from reaching the encoder receiver. The change in the status of the receiver, i.e., receiving light changing to receiving no light, can cause a signal be sent to the computer processor. Such a signal will indicate the input side or output side has rotated.

In another embodiment, the rotational movement may be detected directly from the movement of the outer circumference of the input side or the outer circumference of the output side. For example, the circumference can be periodically marked with reflective material. Alternatively the circumference can be marked with dark (light absorptive) material. An optical encoder can be positioned to transmit a light source onto the circumference.

In an embodiment, the computer processor can compute the amount of offset force that could be generated by a torque force generator.

It will be appreciated that the sensors, both the stationary sensor signal transmitter subcomponent and signal receiver subcomponent are not affixed to the planar torsion spring. These sensors, that may be in communication with the computer processor or microprocessor, are independently mounted to frame or similar structure of the device and are not in the load path experienced by the output side or input side of the torsion spring.

Alternate sensor mechanisms can include a resolver, i.e., an analog encoder that converts an angle into a voltage level that can be read by an analog digital converter (ADC), or an Absolute Position Sensor (APS) that provides an exact angle based on a fixed zero point. In one embodiment, the sensor utilizes an incremental encoder. The incremental encoder requires a startup step of positioning the output and input sides each time the spring is activated.

This specification is to be construed as illustrative only and is for the purpose of teaching those skilled in the art the manner of carrying out the invention. It is to be understood that the forms of the disclosure herein shown and described are to be taken as the presently preferred embodiments. As already stated, various changes may be made in the shape, size and arrangement of components or adjustments made in the steps of the method without departing from the scope of this disclosure. For example, equivalent elements may be substituted for those illustrated and described herein and certain features of the disclosure maybe utilized independently of the use of other features, all as would be apparent to one skilled in the art after having the benefit of this description of the invention.

While specific embodiments have been illustrated and described, numerous modifications are possible without departing from the spirit of the disclosure, and the scope of protection is only limited by the scope of the accompanying claims.

What we claim is:

1. An elastic torque sensor having an elastic torsion spring where the elastic torque sensor is a component of a load transferring or load regulating system and the elastic torque sensor comprises:
   a) an elastic torsion spring having an axis of rotation, an input side and an output side, wherein the torsion spring is positioned to convey a load and the conveyance of the load forms part of a load path wherein the load path includes one or more load or torque conveying components;
   b) the output side or the input side of the elastic torsion spring is structured to rotate or deflect in response to the load;
   c) a first angular position sensor rotor is attached only to the structure of the input side of the torsion spring wherein the first angular position sensor rotor designates angular position or changes in angular position controlled only by rotation or deflection of the input side of the torsion spring and the first angular position sensor rotor attachment point does not convey load or torque;
   d) a second angular position sensor rotor is attached only at a singular circumference to the structure of the output side of the torsion spring wherein the second angular position sensor rotor designates angular position or changes in angular position controlled by rotation or deflection of the output side of the torsion spring and the second angular position sensor rotor attachment point does not convey load or torque;

e) a stationary sensor component positioned to detect movement of at least one angular position sensor rotors; and f) the position stationary sensor component and angular position sensor rotors adapted to detect rotational movement of the of the torsion spring.

2. The elastic torque sensor of claim 1 further comprising two angular position sensor rotors wherein a first angular position sensor rotor is attached to and in contact only with the input side to the torsion spring and a second angular position sensor rotor is attached to and in contact only with the output side of the torsion spring.

3. The elastic torque sensor of claim 1 further comprising sensor rotor detecting marks on the first angular position sensor rotor and detecting marks on the second angular position sensor rotor wherein the angular position sensor rotors are positioned on at least one stationary sensor component positioned on a stationary structure relative to the elastic torsion spring.

4. The elastic torque sensor of claim 1 further comprising a first angular position sensor rotor attached to the input side of the torsion spring wherein the first angular position sensor rotor rotates with the rotation of a torsion spring input side in response to a load and a second angular position sensor rotor attached to a torsion spring output side wherein the second angular position sensor rotor rotates with rotation of the torsion spring output side in response to a load.

5. The elastic torque sensor of claim 2 further comprising at least one stationary sensor component positioned to detect movement of the marks on the first angular position sensor rotor and movement of marks on the second angular position sensor rotor.

6. The elastic torque sensor of claim 3 further comprising at least one stationary sensor component structured to send a signal upon detected movement of either the first or second angular position sensor rotor.

7. The elastic torque sensor of claim 6 further comprising the position stationary sensor components and a programmable controller in communication with the signal from at least one angular position sensor rotor and calculates a difference between a position of the output sensor rotor and the input sensor rotor.

8. The elastic torque sensor of claim 7 wherein the programmable controller measures torque.

9. The elastic torque sensor of claim 1 further comprising the torsion spring structured so either the input side or the output can rotate relative to the other side.

10. The elastic torque sensor of claim 1 further comprising at least one spline connecting the torsion spring input side with the torsion spring output side.

11. The elastic torque sensor of claim 6 wherein the structure of the torsion spring with the angular position sensor rotor and the stationary sensor structured outside the load path is adapted for hysteresis of approximately 0.2% or less of maximum load.

12. The elastic torque sensor of claim 6 wherein each angular stationary sensor is structured detect a load of approximately 0.2 N.

13. The elastic torque sensor of claim 3 wherein either the first angular position sensor rotor or the second angular position sensor rotor is structured to utilize at least one of optical, inductive, capacitive, or other known angular position stationary sensor technology.

14. The elastic torque sensor of claim 9 wherein the angular position sensor rotor contains approximately 120,000 discrete marks.

15. The elastic torque sensor of claim 9 wherein 120,000 discrete marks on an angular position sensor rotor enable high resolution of movement.

16. The elastic torque sensor of claim 11 comprising at least one stationary sensor structured to detect movement of at least one angular position sensor rotor wherein the sensor rotor detects structured movement of the torsion spring having a known stiffness wherein the angular position sensor rotor and stationary sensor are structured to achieve approximately 0.2N/m of torque resolution.

17. An elastic torque sensor comprising a) a planar spring further comprising a first inner ring and a second outer ring wherein the second outer ring is concentrically positioned to the inner ring;

b) an axis of rotation shared by the first inner ring and the second outer ring;

c) the first inner ring and the second outer ring are connected by a plurality of structured deformable and elastic splines;

d) a first angular position sensor rotor is attached to an input side of the first inner ring and a second angular position sensor rotor is attached to an output side of the second outer ring and neither the first angular position sensor rotor or second angular position sensor rotor are within the load path of the torsion spring;

e) the first and second angular position sensor rotors disks are proximately positioned to a first stationary sensor and a second stationary sensor whereby the stationary sensors are positioned and structured to detect rotation of the first and second angular position sensor rotors and the sensor rotors are structured to move with rotation or deflection of the torsion spring; and f) the angular position sensor rotors and stationary sensors are outside the load path experienced by the torsion spring.

18. The elastic torque sensor of claim 17 further comprising a torsion spring comprising three spines wherein each spline comprises concentric arcs extending from and attached to the output side and to the input side.

19. The elastic torque sensor of claim 17 further comprising the angular position sensor rotor rotatable in response to a load and structured to have hysteresis of approximately 0.2% or less of the maximum load experienced by the angular position sensor rotor.

20. A method of measuring movement of an elastic torsion spring in response to placement of a load on either an elastic torsion spring input side or output side comprising:

a) positioning an elastic torsion spring wherein the elastic torsion spring conveys a load and the conveyance of the load forms part of a load path wherein the load path may include one or more load or torque conveying components;

b) attaching a first angular position sensor rotor to the input side of the elastic torsion spring at an attachment point in a structural position separate from and outside the load path;

c) attaching a second angular position sensor rotor to the output side of the elastic torsion spring at an attachment point in a structural position separate from and outside of the load path;

d) moving at least one of the first or second angular position sensor rotors in response to rotation or deflection of the input side or output side of the elastic torsion spring;

e) marking each of the first and second angular position sensor rotors;
f) positioning the marks such that the marks reflect rotation of each angular position sensor rotor;
g) positioning at least two stationary sensors mounted on a stationary structure; and
h) structuring the stationary sensors to detect movement of the marks.

21. The method of claim 20 further comprising sending a signal from the stationary sensors in response to the detected movement of the elastic torsion spring input and output.

22. The method of claim 20 further comprising detecting relative movement of the elastic torsion spring input side with respect to output side in response to a change in torsional load.

23. A method of measuring movement of an elastic torsion spring in response to placement of a load on either the elastic torsion spring input side or output side comprising:
a) positioning an elastic torsion spring in a load path;
b) attaching a first angular position sensor rotor to an input side and a second angular position sensor rotor to an output side of the of the elastic torsion spring wherein the angular position sensor rotors are mounted to structures that are not in the load path of the elastic torsion spring and the angular position sensor rotors rotate with the deflection or rotation of the elastic torsion spring in response to a load;
c) marking each angular position sensor rotors;
d) positioning the marks such that the marks reflect rotation of each angular position sensor rotor;
e) positioning at least two stationary sensors mounted on a stationary structure;
f) structuring the stationary sensors to detect movement of the marks;
g) differencing the angular position of the two sensors to measure spring deflection and
h) inferring torque on the torsion spring by scaling the spring deflection by the spring stiffness constant.

24. A method of measuring movement of a torsion spring in response to placement of a load on either the torsion spring input side or output side comprising:
a) attaching a first sensor rotor outside of the load path to an input side of a torsion spring and attaching a second sensor rotor outside of the load path to an output side of the torsion spring;
b) positioning stationary sensors structured not in the load path of the torsion spring further comprising positioning the stationary sensors to detect rotational movement the sensor rotors;
c) detecting movement of the torsion spring from the movement of the sensor rotors; and
d) detecting the load placed on the torsion by calculation of the amount of spring deflection and the spring constant.

25. The elastic torque sensor of claim 1 wherein the load path conveyed by the elastic torsion spring includes load or torque conveying components comprising at least one of a load transfer mechanism, load bearing torsion spring support, a gear, gear reducer, a rotatable motor shaft or variable speed motor attached to the torsion spring.

26. The elastic torque sensor of claim 1 further comprising:
a) the input side containing a load conveying attachment dimensioned to attach a load conveying component to the torsion spring; and
b) the input side containing a separate first angular position sensor rotor attachment.

27. The elastic torque sensor of claim 26 further comprising the load conveying attachment in communication with a first angular position sensor rotor attachment and a load bearing torsion spring support.

28. The elastic torque sensor of claim 1 further comprising:
a) an output bracket attached to an output side of an elastic torsion spring;
b) an elastic torsion spring support attached to and extending from the elastic torsion spring into or through an aperture of the output bracket;
c) an attachment component of the elastic torsion spring support structured to convey a load or force from the elastic torsion spring; and
d) the output bracket, elastic torsion spring, elastic torsion spring support and attachment component are oriented to the axis of rotation.

* * * * *